United States Patent
Uehara

(10) Patent No.: US 7,138,348 B2
(45) Date of Patent: *Nov. 21, 2006

(54) OPTICAL GLASS

(75) Inventor: Susumu Uehara, Sagamihara (JP)

(73) Assignee: Kabushiki Kaisha Ohara, Sagamihara (JP)

( * ) Notice: Subject to any disclaimer, the term of this patent is extended or adjusted under 35 U.S.C. 154(b) by 308 days.

This patent is subject to a terminal disclaimer.

(21) Appl. No.: 10/731,002

(22) Filed: Dec. 10, 2003

(65) Prior Publication Data

US 2004/0116272 A1    Jun. 17, 2004

Related U.S. Application Data

(63) Continuation-in-part of application No. 10/172,997, filed on Jun. 18, 2002, now Pat. No. 6,753,281.

(30) Foreign Application Priority Data

Jul. 3, 2001    (JP) ............................. 2001-202605

(51) Int. Cl.
*C03C 3/095*    (2006.01)
*C03C 3/097*    (2006.01)
*C03C 3/068*    (2006.01)

(52) U.S. Cl. ............................. 501/64; 501/63; 501/65; 501/78; 501/79; 501/903

(58) Field of Classification Search ............. 501/37, 501/49–51, 73, 77–79, 903, 63–65
See application file for complete search history.

(56) References Cited

U.S. PATENT DOCUMENTS 6,558,316 B1 * 5/2003 Kikuchi et al. ............. 600/133
6,753,281 B1 * 6/2004 Uehara ........................ 501/78
6,844,279 B1 * 1/2005 Hayashi et al. ............. 501/50
2005/0053788 A1 * 3/2005 Terashima et al. ........ 428/411.1
2005/0209085 A1 * 9/2005 Endo .......................... 501/50

FOREIGN PATENT DOCUMENTS

| JP | 54-3115 | 1/1979 |
| JP | 60-221338 | 11/1985 |
| JP | 61-163138 A | 7/1986 |
| JP | 10226533 A | * 8/1998 |

OTHER PUBLICATIONS

Derwent Abstract 1998-514986, abstract of JP 10226533 A.*
Machine translation of JP 10226533 A.*
English Translation of JP 60-221338.
English Translation of JP 61-163138.

* cited by examiner

*Primary Examiner*—J. A. Lorengo
*Assistant Examiner*—Elizabeth A. Bolden
(74) *Attorney, Agent, or Firm*—Oliff & Berridge, PLC

(57) ABSTRACT

An optical glass has optical constants which are an refractive index (nd) of 1.70–1.75 and an Abbe number (vd) of 45.0–54.0; a glass transformation temperature (Tg) of 500–580° C. The glass has the following composition in mass percent of: $SiO_2$ more than 5–15%; $B_2O_3$ 20-less than 30%; a total amount of $SiO_2+B_2O_3$ more than 25–40%; $La_2O_3$ more than 21-less than 30%; $Y_2O_3$ more than 5–15%; $Gd_2O_3$ 0-less than 10%; $ZrO_2$ 1–8%; $Nb_2O_5$ 0.1–5%; $Ta_2O_5$ more than 5–12%; a total amount of $ZrO_2+Nb_2O_5+Ta_2O_5$ 7–20%; ZnO 0–10%; CaO 0–10%; SrO 0–5%; BaO 0–10%; a total amount of $ZnO+CaO+SrO+BaO$ 5–15%; $Li_2O$ 1–8%; $Sb_2O_3$ 0–1%; and $As_2O_3$ 0–1%. The glass is substantially free of $Yb_2O_3$ and $Al_2O_3$. Devitrification is not generated when the optical glass is kept at a temperature of 920° C. for two hours.

6 Claims, No Drawings

OPTICAL GLASS

This is a Continuation-in-Part of application Ser. No. 10/172,997 filed Jun. 18, 2002 now U.S. Pat. No.6,753,281 issued on Jun. 22, 2004. The entire disclosure of the prior application is hereby incorporated by reference herein in its entirety.

BACKGROUND OF THE INVENTION

1. Field of the Invention

The present invention relates to an optical glass of a lanthanum borosilicate system having a low glass transformation temperature (Tg) and excellent resistance to devitrification property, the optical glass having optical constants which are a refractive index (nd) in a range of 1.70 to 1.75 and an Abbe number (vd) in a range of 45.0 to 54.0, the optical glass being suitable for forming a glass preform material used for precision press molding, and being suitable for precision press molding.

2. Description of Related Art

Precision press molding of a glass is a technique to obtain a glass molded product having a shape of a final product or a shape extremely close to the final product and surface accuracy by performing press molding to a glass preform material, which is soften by heating, under a high temperature by using a molding die having a cavity with a predetermined shape. According to the precision press molding, it is possible to manufacture a molded product with a desired shape on the basis of high productivity without performing grinding and polishing, or hardly performing grinding and polishing after molding. Therefore, at present, glass molded products, such as spherical lenses, aspherical lenses and the like, have been manufactured by precision press molding.

Recently, miniaturizing and lightening of optical devices have been remarkably progressing. Aspherical lenses are used so as to decrease the number of lenses that construct an optical system of the optical devices. Since it is extremely difficult to manufacture an aspherical lens in large quantities and inexpensively by a method according to grinding and polishing in earlier technology, the above-described precision press molding is the most suitable molding method for manufacturing particularly an aspherical lens.

In order to obtain a glass molded product by the precision press molding, it is necessary to perform press molding to a glass preform material under a high temperature, as described above. Therefore, the molding die used in this case is also exposed to the high temperature, and a high pressure is added thereto. Thereby, in respect to the optical glass that constructs the glass preform material, it is desired to make its glass transformation temperature (Tg) as low as possible from the viewpoint of preventing the wear of the molding surface of the molding die caused by oxidation of the surface in accordance with high temperature environment and the damage of the molding surface of the molding die in accordance with the high press pressure when press molding is performed.

As a method for manufacturing a glass preform material for performing precision press molding, there is a method for manufacturing a glass preform material having a shape close to the shape of the lens, which is a final product, or having a spherical shape by obtaining a glass block cut from a glass block material, and by grinding and polishing the glass block. However, since the cutting process of the glass block material, grinding and polishing processes are required, there is a problem that those processes take time. Further, there is a method for obtaining a glass preform material by dropping or flowing down a molten glass from the tip of an efflux pipe connected to a glass melting device, forming the molten glass in a die or the like, and cooling it. In this method, cutting from a glass block material, grinding and polishing processes are not required, and it is possible to obtain the glass preform material directly from the molten glass. Therefore, as a method for manufacturing a glass preform material, the latter method is the method that has the highest mass-productivity and the manufacturing cost is the lowest. The shape of the glass preform material obtained by the latter method is a biconvex lens-like or a spherical shape. In many cases, the biconvex lens-like shape is the shape close to the shape of an aspherical lens, which is a final product, or the like. Therefore, variations in shape when precision press molding is performed can be made small, and the biconvex lens-like glass preform material has an effect of remarkably improving the mass-productivity of the lens itself. Further, when it is a spherical shape, although variations in shape when precision press molding is performed become large in many cases, there is a merit that the glass preform material can be set easily in the center of a lower die of the molding die whose molding surface is usually a concave surface.

Incidentally, in the press molding technique of glasses in earlier technology, even though devitrification was generated on a surface of a glass preform material or a pressed glass molded product, the portion of devitrification on the surface was removed by grinding or polishing performed after press molding. Therefore, it was not a problem if devitrification was not generated in the inside of the glass. However, in the precision press molding, a glass molded product to which precision pressing is performed without performing grinding and polishing or hardly performing grinding and polishing after molding is used as an optical element, such as a lens or the like. Therefore, it cannot be used as a product even if devitrification is generated only on a surface of a glass preform material or a glass molded product. That is, in the glass preform material used for precision press molding and the optical glass used for precision press molding, it is required that devitrification is not generated at a temperature suitable for forming the glass preform material, and moreover, that devitrification is not generated when precision press molding is performed to the obtained glass preform material, in addition to the glass transformation temperature (Tg) being low, as mentioned above.

Devitrification of a glass is caused when the temperature range of the glass is in the range that the nucleation temperature range and the crystal growth temperature range, which is in the high temperature side rather than the nucleation temperature range, are overlapped. The longer the time that the glass is exposed to this temperature range is, the more the crystal is grown and the devitrification progresses. In the method for manufacturing a glass preform material by dropping or flowing down a molten glass, as mentioned above, when the viscosity of the molten glass for dropping or flowing down from the tip of an efflux pipe is too low, it becomes difficult to obtain a preform material having a smooth curved surface and a spherical shape or a shape close to a biconvex lens-like shape. Further, when the viscosity of the molten glass is too high, both dropping a glass having a weight for one piece of preform material from the tip of the efflux pipe, and separating a glass gob having a weight for one piece of preform from the molten glass flow flowed down from the tip of the efflux pipe by surface tension or the like, become difficult. Therefore, it is desired to adjust the viscosity (η) of the molten glass for being dropped or flowed down in a range of logη=approximately 1.5 to approximately 2.5.

Incidentally, for the molten glass for being dropped or flowed down from the tip of the efflux pipe, it is comparatively hard to generate devitrification since the molten glass does not remain in the temperature range that the nucleation temperature range and the crystal growth temperature range are overlapped for a long time generally. However, for the glass deposited to the peripheral portion of the tip of the efflux pipe, devitrification is easily generated since it is exposed to the temperature range lower than the upper limit of the temperature range that the nucleation temperature range and the crystal growth temperature range are overlapped, that is, the temperature range that devitrification is generated, for a long time. Then, the glass in which devitrification is generated is gradually involved in the molten glass which is dropped or flowed down. Therefore, after forming of the preform material is started, devitrification becomes to be included in the glass preform material as time passes.

As a method for preventing the above-mentioned devitrification, there is a method of raising the temperature of the tip of the efflux pipe temporarily to the temperature that devitrification of the glass disappears for every predetermined time. However, as mentioned above, while the temperature of the tip of the efflux pipe is raised, the viscosity of the glass is too low, so that it is difficult to obtain a preform material having a smooth curved surface and a spherical shape or a shape close to a biconvex lens-like shape. Thereby, when the temperature of the tip of the efflux pipe is raised frequently, the productive efficiency deteriorates remarkably. Therefore, in order to manufacture a glass preform material stably and continuously, it is required to be a glass that the upper limit of the temperature range which the nucleation temperature range and the crystal growth temperature range are overlapped is as low as possible. Moreover, it is required to be a glass that devitrification is not generated even though it is kept in the temperature suitable for forming a preform material for a long time.

Further, when the precision press molding is performed by heating and softening a glass preform material, devitrification is generated since the glass preform material is exposed to the temperature range higher than the lower limit of the temperature range that the nucleation temperature range and the crystal growth temperature range are overlapped. Therefore, it is required to be a glass that the lower limit of the temperature range that the nucleation temperature range and the crystal growth temperature range are overlapped is as high as possible, and that devitrification is not generated even though it is kept in the temperature suitable for precision press molding.

The optical glass used for an aspherical lens or the like is required to have various optical constants. In particular, a glass having optical constants that are a refractive index (nd) in a range of 1.70 to 1.75 and an Abbe number (vd) in a range of about 45 to 54 is required. In earlier technology, as a glass having optical constants in the above-described ranges, a lanthanum borosilicate system glass and a lanthanum borate system glass are known as typical glasses. However, the glasses of such systems have high glass transformation temperature (Tg), and moreover, devitrification is easily generated in many cases. Therefore, from the above-mentioned reasons, a glass having a low glass transformation temperature (Tg) and excellent resistance to devitrification property is required. Further, the general standard of the superiority or inferiority in a light transmittance in an optical glass is a wavelength which shows 80% of spectral transmittance including a reflection loss in a short wavelength side. The shorter the wavelength is, the better the light transmittance is, so that it can be said that it is a glass with little coloring. However, in the lanthanum borosilicate system glass and the lanthanum borate system glass that have not less than 1.70 of refractive index (nd), the wavelength showing above-described 80% is not less than 400 nm in many cases, so that improvement in light transmittance is also required.

For example, the Japanese Patent Laid-open Publication No. Sho 54-3115 discloses an optical glass of $B_2O_3$—$SiO_2$—$La_2O_3$—$ZrO_2$—$SnO_2$-bivalent metal oxide system. Although this glass has an excellent light transmittance, its glass transformation temperature (Tg) is high, so that it is unsuitable for using in precision press molding. Further, melting and refining of a lanthanum system optical glass is performed by using a melting device having a crucible or refining tank made of platinum or platinum alloy. While the glass is melted, alloying of the Pt of the crucible or the refining tank and the Sn of this glass is performed, and the alloyed portion is inferior to in heat resistance. Therefore, there may happen an accident such that a hole is opened in the crucible or the refining tank and the molten glass is flowed out from the hole. The cause of this accident is considered because the $SnO_2$ included as an essential component in the glass is reduced to be SnO while melting or refining is performed, and moreover to Sn. Such an accident is rarely caused. However, when once occurred, economical loss is extremely large since the melting must be stopped immediately so as to dispose the melted glass by flowing it out, the melting device must be dismantled, and the alloyed platinum or platinum alloy must be recast, and then the hole-opened crucible or the refining tank must be repaired. Therefore, it must be said that this glass is unsuitable for producing safely and in large quantities by using a melting device having a crucible or a refining tank or the like, a portion which contacts with the molten glass being formed by a platinum or a platinum alloy.

Further, the Japanese Patent Laid-open Publication No. Sho 60-221338 discloses an optical glass of $B_2O_3$—$La_2O_3$—$Y_2O_3$—$Li_2O$-bivalent metal oxide system. The object of this glass is to improve its resistance to devitrification property. However, its resistance to devitrification property is not sufficient to form a glass preform material by using the above-mentioned method of dropping or flowing down a molten glass.

Further, in earlier technology, a glass including a PbO component or a glass including a fluorine component is known as a glass having a low glass transformation temperature (Tg). However, for the glass including the PbO component, since the glass is easily fused with the die when precision press molding is performed, it is difficult to use the die repeatedly. Therefore, it is unsuitable for using in precision press molding. Further, for the glass including the fluorine component, when forming of a preform material is performed, the fluorine component is selectively volatilized from the surface layer of the molten glass and clouds are generated in the preform material, or the fluorine component is volatilized and deposited to the die when precision press molding is performed to the preform material, and clouds are generated on the surface of the die or the surface of the glass molded product to which the precision press molding is performed. For these reasons or the like, it is not suitable as a glass for manufacturing a glass preform material for using in precision press molding or as a glass for using in precision press molding.

SUMMARY OF THE INVENTION

An object of the present invention is to improve synthetically the defects seen in the glasses in earlier technology, and is to provide an optical glass of a lanthanum borosilicate system suitable for forming a glass preform material for using in precision press molding and suitable for precision press molding, the optical glass having optical constants which are a refractive index (nd) in a range of 1.70 to 1.75 and an Abbe number (vd) in a range of 45.0 to 54.0, and having a low glass transformation temperature (Tg) in a range of 500 to 580° C., and the optical glass having excellent resistance to devitrification property and an excellent light transmittance.

In order to accomplish the above-described object, the inventor has examined and researched an optical glass. As a result, the inventor has found that an optical glass having optical constants in the desired ranges and a low glass transformation temperature, the optical glass having further excellent resistance to devitrification property when forming of a preform material and precision press molding are performed while an excellent light transmittance is maintained, is obtained in a limited and particular composition range of $SiO_2$—$B_2O_3$—$La_2O_3$—$Y_2O_3$—$ZrO_2$—$Nb_2O_5$—$Ta_2O_5$—$Li_2O$—ZnO and/or CaO and/or SrO and/or BaO system composition that is not concretely disclosed in earlier technology. Then, the present invention has been accomplished.

That is, in order to accomplish the above-described object, according to an aspect of the present invention, an optical glass comprises: optical constants which are a refractive index (nd) in a range of 1.70 to 1.75 and an Abbe number (vd) in a range of 45.0 to 54.0; a glass transformation temperature (Tg) in a range of 500 to 580° C.; more than 5 to 15 mass % of $SiO_2$; 20 to less than 30 mass % of $B_2O_3$; a total amount of $SiO_2+B_2O_3$ being more than 25 to 40 mass %; more than 21 to less than 30 mass % of $La_2O_3$; more than 5 to 15 mass % of $Y_2O_3$; 0 to less than 10 mass % of $Gd_2O_3$; 1 to 8 mass % of $ZrO_2$; 0.1 to 5 mass % of $Nb_2O_5$; more than 5 to 12 mass % of $Ta_2O_5$; a total amount of $ZrO_2+Nb_2O_5+Ta_2O_5$ being 7 to 20 mass %; 0 to 10 mass % of ZnO; 0 to 10 mass % of CaO; 0 to 5 mass % of SrO; 0 to 10 mass % of BaO; a total amount of ZnO+CaO+SrO+BaO being 5 to 15 mass %; 1 to 8 mass % of $Li_2O$; 0 to 1 mass % of $Sb_2O_3$; and 0 to 1 mass % of $As_2O_3$; wherein the optical glass is substantially free of $Yb_2O_3$ and $Al_2O_3$, and devitrification is not generated when the optical glass is kept at a temperature of 920° C. for two hours.

Further, the devitrification may not be generated when the optical glass is kept at a temperature of the glass transformation temperature (Tg)+80° C. for 30 minutes.

Moreover, the devitrification may not be generated when the optical glass is kept at a temperature of the glass transformation temperature (Tg)+140° C. for 30 minutes.

The optical glass according to the present invention has excellent resistance to devitrification property. However, in order to manufacture a glass preform material stably and continuously by using a method of dropping or flowing down a molten glass from a tip of an efflux pipe, it is preferable to keep the optical glass at the temperature of 920° C. for two hours so as not to generate devitrification.

Further, the temperature of the glass preform material when precision press molding is performed differs according to the high or low of a press pressure. When a molding die is not worn even though the press pressure is made high, it is sufficient if it is the temperature of the glass transformation temperature (Tg)+80° C. When the press pressure is made low, it is sufficient if it is the temperature of the glass transformation temperature (Tg)+140° C. The time taken for the precision press molding itself is generally about several-tens seconds. However, considering the step of heating and softening the glass preform material before precision press molding, and the step of annealing a glass molded product after the precision press molding, it is desired that the devitrification is not generated when it is kept at the above-described temperatures for 30 minutes, for safety. Therefore, it is preferable that the devitrification is not generated when it is kept at the temperature of the glass transformation temperature (Tg)+80° C. for 30 minutes. Moreover, it is also preferable that the devitrification is not generated when it is kept at the temperature of the glass transformation temperature (Tg)+140° C. for 30 minutes.

Furthermore, the optical glass may be substantially free of a fluorine, a PbO, a $WO_3$ and an $SnO_2$ components.

PREFERRED EMBODIMENT OF THE INVENTION

The reason why the composition range of each component is limited as described above in an optical glass according to the present invention will be explained in the following.

More than 5% of the $SiO_2$ component need to be included in the optical glass in order to improve the resistance to devitrification property of the glass and to maintain an excellent light transmittance. However, when its amount is over 15%, it becomes difficult to maintain the low glass transformation temperature (Tg). Therefore, it is limited in a range of more than 5% to 15%.

The $B_2O_3$ component is a component added in order to improve the resistance to devitrification property of the glass and to keep the glass transformation temperature (Tg) low. When its amount is less than 20%, the resistance to devitrification property of the glass deteriorates. Further, when its amount is not less than 30%, the chemical durability of the glass becomes bad and it becomes difficult to obtain the desired optical constants. Therefore, it is limited in a range from 20 to less than 30%.

The total amount of the $SiO_2$ and the $B_2O_3$ components should be in a range of more than 25% to 40% in order to maintain the excellent resistance to devitrification property and the target optical constants. Further, in order to obtain a glass particularly excellent in the light transmittance, it is preferable that the total amount of the $SiO_2$ and the $B_2O_3$ components is more than 32%.

The $La_2O_3$ component is an effective component for increasing the refractive index of the glass and lowering dispersion (making the Abbe number large) in the glass. When its amount is not more than 21%, it is impossible to make a refractive index of the glass into a desired value. Further, when its amount is not less than 30%, the resistance to devitrification property of the glass deteriorates. Therefore, it is limited in a range of more than 21% to less than 30%. Further, it is preferable that its amount is not more than 27%, since a glass excellent in resistance to devitrification property can be obtained easily.

The $Y_2O_3$ component is an effective component for increasing the refractive index of the glass and lowering dispersion (making the Abbe number large) in the glass, and is a component having an effect of improving the resistance to devitrification property of the glass. When its amount is not more than 5%, it becomes difficult to obtain the desired resistance to devitrification property. Further, when its amount is over 15%, the resistance to devitrification property deteriorates on the contrary. Therefore, it is limited in a range of more than 5% to 15%.

The $Gd_2O_3$ component is an effective component for increasing the refractive index of the glass and lowering dispersion (making the Abbe number large) in the glass. However, when its amount is not less than 10%, the resistance to devitrification property deteriorates. Therefore, it is limited in a range of 0 to less than 10%.

The $ZrO_2$ component has an effect of adjusting the optical constants and improving the resistance to devitrification property of the glass. However, when its amount is less than 1%, no remarkable effect can be seen. Further, when its amount is over 8%, the resistance to devitrification property deteriorates on the contrary. Therefore, it is limited in a range of 1 to 8%.

The $Nb_2O_5$ component has an effect of adjusting the optical constants and improving the resistance to devitrification property of the glass. However, when its amount is less than 0.1%, no remarkable effect can be seen. Further, when its amount is over 5%, the resistance to devitrification property deteriorates on the contrary. Therefore, it is limited in a range of 0.1 to 5%.

The $Ta_2O_5$ component has an effect of adjusting the optical constants and improving the resistance to devitrification property of the glass. However, when its amount is not more than 5%, no remarkable effect can be seen. Further, when its amount is over 12%, the resistance to devitrification property deteriorates on the contrary. Therefore, it is limited in a range of more than 5% to 12%.

Further, in the present invention, it is particularly important to make the three components of the $ZrO_2$, $Nb_2O_5$ and $Ta_2O_5$ coexist in order to obtain a glass excellent in both the resistance to devitrification property in the glass preform material forming temperature range and the resistance to devitrification property in the precision press molding temperature range. When the total amount of these three components is less than 7%, no remarkable effect in respect to the improvement in the resistance to devitrification property can be seen. When the total amount of these three components is over 20%, the devitrification is easily generated on the contrary. Therefore, the total amount of these three components is limited in a range of 7 to 20%. Further, it is preferable that the total amount of these three components is not less than 11.5% in order to obtain a glass particularly excellent in the resistance to devitrification property easily.

The ZnO component has an effect of lowering the glass transformation temperature (Tg) and improving the resistance to devitrification property of the glass. However, when its amount is over 10%, the resistance to devitrification property deteriorates on the contrary. Therefore, it is limited in a range of 0 to 10%.

Each of the CaO, SrO and BaO components has an effect of adjusting the optical constants and improving the resistance to devitrification property of the glass. However, when the amounts of the CaO, SrO and BaO components are over 10%, 5% and 10%, respectively, the resistance to devitrification property deteriorates on the contrary, and the chemical durability also deteriorates.

Further, when the total amount of one or more selected from the ZnO, CaO, SrO and BaO components is less than 5%, the resistance to devitrification property of the glass is not improved sufficiently. Further, when the total amount of these components is over 15%, the resistance to devitrification property tends to deteriorate on the contrary. Therefore, the resistance to devitrification property of the glass becomes good when the total amount of these components is in a range of 5 to 15%.

Further, it is preferable that the total amount of these components is not more than 14% in order to obtain a glass particularly excellent in the resistance to devitrification property.

The $Li_2O$ component is a component having an effect of lowering the glass transformation temperature (Tg). However, when its amount is less than 1%, that effect cannot be obtained. Further, when its amount is over 8%, the resistance to devitrification property deteriorates rapidly. Therefore, it is limited in a range of 1 to 8%.

The $Sb_2O_3$ and $As_2O_3$ component can be added in order to defoam when the glass is melted. In order to obtain an effect of defoaming, it is sufficient when the amounts of these components are up to 1%, respectively.

Further, besides the above-described components, a proper amount of components, such as $Na_2O$, $K_2O$, $Rb_2O$, $Cs_2O$, MgO, $TiO_2$, $HfO_2$, $Al_2O_3$, $P_2O_5$, $Ga_2O_3$, $In_2O_3$, $GeO_2$, $TeO_2$, CeO $Tl_2O$, $Bi_2O_3$, $Yb_2O_3$ and the like, can be included in the optical glass according to the present invention within a range of the object of the present invention in order to adjust the optical constants, to improve the melting property, to improve the chemical durability, or the like. However, in the glass components of the present invention, it is preferable not to include $Yb_2O_3$ and $Al_2O_3$ components since $Yb_2O_3$ and $Al_2O_3$ components deteriorate the resistance to devitrification property.

Further, as mentioned above, since the fluorine and PbO components are the components having an influence which is not preferable when forming of a glass preform and precision press molding are performed, those components should not be included in the optical glass according to the present invention. Further, since the $WO_3$ component is a component for deteriorating the light transmittance of the glass and for increasing the coloration, it should not be included in the optical glass according to the present invention. Moreover, since the $SnO_2$ component is a component having a risk for causing a serious accident such that a hole is opened in a platinum crucible or the like while the glass is melted, it should not be included in the optical glass according to the present invention.

EXAMPLES

Hereinafter, preferred examples according to the present invention will be explained. In addition, the present invention is not limited to the examples in the following.

Compositions of the examples of the optical glasses according to the present invention (No. 1 to No. 10) and those of the comparative examples of the optical glasses in earlier technology (No. A to No. E), and the refractive index (nd), the Abbe number (vd), the glass transformation temperature (Tg) and the coloration of the glass obtained in each of the examples and comparative examples are shown in Table 1 to Table 3.

Here, the glass transformation temperatures (Tg) were obtained based upon "Measuring Method for Thermal Expansion of Optical Glass" JOGIS08-[1975], Japanese Optical Glass Industrial Standards. Each sample, which is a round bar with a length of 50±5 mm and a diameter of 4±0.5 mm, was heated so that the temperature rises in a predetermined rate of 4° C. per minute. Then, a thermal expansion curve was obtained by measuring the temperature and the elongation of the sample. Thereafter, each glass transformation temperature was obtained from the thermal expansion curve.

Further, the colorations were obtained based upon "Measuring Method for Coloration of Optical Glass" JOGIS02-

1975, Japanese Optical Glass Industrial Standards. The spectral transmittance including a reflection loss of each sample with a thickness of 10±0.1 mm, the facing surfaces of which are polished in parallel, was measured. The first place of the integer of the wavelength showing a transmittance of 80% was rounded off, so that each coloration was shown as making 10 nm as a unit. The smaller the value of the coloration is, the more excellent the light transmittance in the short wavelength side is.

In addition, for the optical glasses in the examples No. 1 to No. 10 according to the present invention, normal optical glass raw materials, such as oxides, carbonates, nitrates or the like, were weighed and mixed at the predetermined ratio so as to obtain the composition ratios in Table 1 and Table 2. Then, they were put into a 300 cc platinum crucible and molten at a temperature of 1000 to 1300° C. for two to four hours according to difficulty of the melting property depending on the composition of the glass and then it was stirred and homogenized. Thereafter, its temperature was lowered, and it was cast in a die or the like and annealed. Thereby, the optical glasses in the examples No. 1 to No. 10 were easily obtained.

Further, the results of devitrification tests of the glass in each of the above-described examples and comparative examples are shown in Table 4 and Table 5. Here, for the devitrification test 1 for evaluating the resistance to devitrification property when the glass preform is formed, 100 g of each glass raw material weighed and mixed for the predetermined ratio was put into a 50 cc crucible made of platinum so that the composition ratio of each example and each comparative example becomes as shown in Table 1 to Table 3. Then, each raw material was molten at a temperature of 1200 to 1300° C. for two hours in an electric furnace according to difficulty of the melting property depending on the composition of the glass so as to be a complete glass melt without devitrification. Thereafter, its temperature was lowered, and it was kept in the furnace at each temperature of 1000° C., 980° C., 920° C., 900° C. and 880° C. for two hours. Thereafter, it was taken out of the furnace, and then observed by a microscope about the presence or absence of the devitrification. As the results of the observation, a glass in which no devitrification is observed is indicated by a circle mark (○), a glass in which devitrification is observed only on a surface is indicated by a triangle mark (Δ), and a glass in which devitrification is observed inside is indicated by a cross mark (x).

Further, for the devitrification test 2 for evaluating the resistance to devitrification property when precision press molding is performed, each sample, in which the glass of each example and each comparative example shown in Table 1 to Table 3 was made into a cube of 10 mm square, was put onto a flat plate of a heat resistant ceramics. Then, each sample was put into the electric furnace and its temperature was raised to each temperature of Tg+100° C., Tg+120° C. and Tg+140° C., and was kept at these temperatures for 30 minutes. Thereafter, each sample was taken out from the furnace, and then observed by the microscope about the presence or absence of the devitrification. As the results of the observation, a glass in which no devitrification is observed is indicated by a circle mark (○), a glass in which devitrification is observed only on a surface is indicated by a triangle mark (Δ), and a glass in which devitrification is observed inside is indicated by a cross mark (x).

TABLE 1

(mass %)

| | | No. EXAMPLE | | | | |
|---|---|---|---|---|---|---|
| | | 1 | 2 | 3 | 4 | 5 |
| COMPOSI- | $SiO_2$ | 5.2 | 5.1 | 15.0 | 8.0 | 10.8 |
| TION OF | $B_2O_3$ | 29.9 | 28.0 | 25.0 | 26.0 | 24.6 |
| GLASS | $Y_2O_3$ | 10.0 | 12.0 | 14.4 | 5.9 | 12.0 |
| | $La_2O_3$ | 21.1 | 25.0 | 25.5 | 22.1 | 26.5 |
| | $Gd_2O_3$ | 4.3 | | 5.0 | 9.9 | |
| | $ZrO_2$ | 8.0 | 3.0 | 1.0 | 4.0 | 5.0 |
| | $Nb_2O_5$ | 0.5 | 5.0 | 0.1 | 1.0 | 0.5 |
| | $Ta_2O_5$ | 7.0 | 12.0 | 5.9 | 6.0 | 7.0 |
| | ZnO | 3.0 | 5.0 | 2.0 | | 5.5 |
| | SrO | 2.0 | | | 5.0 | |
| | BaO | 5.0 | 3.0 | 3.0 | 10.0 | 5.0 |
| | $Li_2O$ | 3.0 | 1.8 | 3.0 | 2.0 | 3.0 |
| | $Sb_2O_3$ | 1.0 | 0.1 | 0.1 | 0.1 | 0.1 |
| TOTAL | | 100.0 | 100.0 | 100.0 | 100.0 | 100.0 |
| $SiO_2 + B_2O_3$ | | 35.1 | 33.1 | 40.0 | 34.0 | 35.4 |
| $ZrO_2 + Nb_2O_5 + Ta_2O_5$ | | 15.5 | 20.0 | 7.0 | 11.1 | 12.5 |
| ZnO + SrO + CaO + BaO | | 10.0 | 8.0 | 5.0 | 15.0 | 10.5 |
| nd | | 1.714 | 1.720 | 1.715 | 1.730 | 1.733 |
| vd | | 48.8 | 47.2 | 52.2 | 50.7 | 49.4 |
| Tg (° C.) | | 560 | 562 | 578 | 543 | 571 |
| COLORATION | | 37 | 38 | 38 | 37 | 37 |

TABLE 2

(mass %)

| | | No. EXAMPLE | | | | |
|---|---|---|---|---|---|---|
| | | 6 | 7 | 8 | 9 | 10 |
| COMPOSI- | $SiO_2$ | 12.0 | 11.0 | 10.8 | 5.1 | 10.0 |
| TION OF | $B_2O_3$ | 20.0 | 29.0 | 24.6 | 20.0 | 23.0 |
| GLASS | $Y_2O_3$ | 5.2 | 15.0 | 10.0 | 10.0 | 9.0 |
| | $La_2O_3$ | 29.9 | 22.0 | 23.5 | 28.0 | 24.0 |
| | $ZrO_2$ | 7.0 | 3.0 | 6.0 | 7.0 | 6.0 |
| | $Nb_2O_5$ | 0.5 | 0.9 | 0.5 | 2.0 | 0.5 |
| | $Ta_2O_5$ | 11.0 | 8.0 | 9.0 | 5.1 | 10.0 |
| | ZnO | 8.0 | 10.0 | 5.5 | | 3.0 |
| | CaO | 3.0 | | 5.0 | 3.7 | 10.0 |
| | SrO | 1.0 | | | 3.0 | |
| | BaO | | | 2.0 | 8.0 | |
| | $Li_2O$ | 2.3 | 1.0 | 3.0 | 8.0 | 4.5 |
| | $Sb_2O_3$ | 0.1 | 0.1 | 0.1 | 0.1 | |
| TOTAL | | 100.0 | 100.0 | 100.0 | 100.0 | 100.0 |
| $SiO_2 + B_2O_3$ | | 32.0 | 40.0 | 35.4 | 25.1 | 33.0 |
| $ZrO_2 + Nb_2O_5 + Ta_2O_5$ | | 18.5 | 11.9 | 15.5 | 14.1 | 16.5 |
| ZnO + SrO + CaO + BaO | | 12.0 | 10.0 | 12.5 | 14.7 | 13.0 |
| nd | | 1.747 | 1.742 | 1.732 | 1.749 | 1.705 |
| vd | | 46.4 | 51.5 | 48.8 | 48.2 | 47.5 |
| Tg (° C.) | | 542 | 550 | 565 | 504 | 527 |
| COLORATION | | 39 | 37 | 37 | 39 | 38 |

TABLE 3

(mass %)

| | | No. COMPARATIVE EXAMPLE | | | | |
|---|---|---|---|---|---|---|
| | | A | B | C | D | E |
| COMPOSI- | $SiO_2$ | 6.0 | 3.0 | | | 18.0 |
| TION OF | $B_2O_3$ | 33.0 | 35.0 | 30.0 | 30.0 | 17.0 |
| GLASS | $Y_2O_3$ | 16.0 | 18.0 | 4.0 | 2.0 | 7.0 |
| | $La_2O_3$ | 22.0 | 22.0 | 16.0 | 40.0 | 25.0 |

TABLE 3-continued (mass %)

| | No. COMPARATIVE EXAMPLE | | | | |
|---|---|---|---|---|---|
| | A | B | C | D | E |
| $ZrO_2$ | 4.0 | 7.0 | | 5.9 | 6.0 |
| $Nb_2O_5$ | | | | 6.0 | |
| $Ta_2O_5$ | | 7.8 | 13.0 | 7.0 | |
| ZnO | 2.0 | | 35.0 | 2.0 | |
| CaO | 12.0 | 6.0 | | | 8.0 |
| BaO | 2.0 | | | 4.0 | 13.0 |
| $Li_2O$ | 3.0 | 1.2 | 2.0 | 1.1 | 2.2 |
| $Al_2O_3$ | | | | | 0.8 |
| $WO_3$ | | | | 2.0 | 3.0 |
| TOTAL | 100.0 | 100.0 | 100.0 | 100.0 | 100.0 |
| $SiO_2 + B_2O_3$ | 39.0 | 38.0 | 30.0 | 30.0 | 35.0 |
| $ZrO_2 + Nb_2O_5 + Ta_2O_5$ | 4.0 | 14.8 | 13.0 | 18.9 | 6.0 |
| ZnO + SrO + CaO + BaO | 16.0 | 6.0 | 35.0 | 6.0 | 21.0 |
| nd | 1.705 | 1.734 | 1.744 | 1.800 | 1.714 |
| vd | 53.5 | 49.7 | 45.4 | 43.4 | 50.3 |
| Tg (° C.) | 550 | 633 | 513 | 619 | 584 |
| COLORATION | 38 | 38 | 39 | 41 | 42 |

TABLE 4

| | | No. EXAMPLE | | | | | | |
|---|---|---|---|---|---|---|---|---|
| | | 1 | 2 | 3 | 4 | 5 | 6 | 7 |
| DEVITRIFICATION TEST 1 | 1000° C. | ○ | ○ | ○ | ○ | ○ | ○ | ○ |
| | 960° C. | ○ | ○ | ○ | ○ | ○ | ○ | ○ |
| | 920° C. | ○ | ○ | ○ | ○ | ○ | ○ | ○ |
| | 900° C. | ○ | ○ | Δ | Δ | ○ | ○ | ○ |
| | 880° C. | ○ | ○ | Δ | Δ | ○ | ○ | ○ |
| DEVITRIFICATION TEST 2 | Tg + 140° C. | ○ | ○ | ○ | ○ | ○ | ○ | ○ |
| | Tg + 120° C. | ○ | ○ | ○ | ○ | ○ | ○ | ○ |
| | Tg + 100° C. | ○ | ○ | ○ | ○ | ○ | ○ | ○ |
| | Tg + 80° C. | ○ | ○ | ○ | ○ | ○ | ○ | ○ |

TABLE 5

| | | No. | | | | | | | |
|---|---|---|---|---|---|---|---|---|---|
| | | EXAMPLE | | | COMPARATIVE EXAMPLE | | | | |
| | | 8 | 9 | 10 | A | B | C | D | E |
| DEVITRIFICATION TEST 1 | 1000° C. | ○ | ○ | ○ | ○ | ○ | ○ | ○ | ○ |
| | 960° C. | ○ | ○ | ○ | Δ | Δ | Δ | x | ○ |
| | 920° C. | ○ | ○ | ○ | x | x | x | x | x |
| | 900° C. | ○ | Δ | ○ | x | x | x | x | x |
| | 880° C. | ○ | Δ | ○ | x | x | x | x | x |
| DEVITRIFICATION TEST 2 | Tg + 140° C. | ○ | ○ | ○ | x | x | x | x | Δ |
| | Tg + 120° C. | ○ | ○ | ○ | x | x | x | x | ○ |
| | Tg + 100° C. | ○ | ○ | ○ | Δ | x | x | x | ○ |
| | Tg + 80° C. | ○ | ○ | ○ | Δ | x | Δ | x | ○ |

As shown in Table 1 to Table 3, in the glasses in the examples according to the present invention (No. 1 to No. 10), each refractive index (nd) is in a range within 1.70 to 1.75, each Abbe number (vd) is in a range within 45.0 to 54.0, and each glass in the examples No. 1 to No. 10 have a low glass transformation temperature (Tg) in a range within 500 to 580° C. Further, the glasses in the examples according to the present invention (No. 1 to No. 10) have the coloration between 37 and 39. Therefore, it can be recognized that each light transmittance from the short wavelength side of the visible range to the near ultraviolet range is equivalent or more excellent compared with the optical glasses in earlier technology in comparative examples shown in Table 3.

Further, as shown in Table 4 and Table 5, in the glasses in the examples according to the present invention (No. 1 to No. 10), as a result of the devitrification test 1, devitrification is not generated at 920° C., and the temperature that devitrification is not generated is lower than the glasses in the comparative examples. Further, in the devitrification test 2, devitrification is not generated at Tg+140° C., and the temperature that devitrification is not generated is higher than the glasses in the comparative examples. The optical glasses in the examples according to the present invention are remarkably excellent in the resistance to devitrification properties at both in the temperature range when forming of glass preform materials is performed and in the temperature range when precision press molding is performed, compared with the optical glasses in earlier technology in the comparative examples. In particular, it can be recognized that the optical glasses in the examples according to the present invention are suitable for forming glass preform materials and for precision press molding.

As described above, the optical glass according to the present invention is an optical glass of $SiO_2$—$B_2O_3$—$La_2O_3$—$Y_2O_3$—$ZrO_2$—$Nb_2O_5$—$Ta_2O_5$—$Li_2O$—ZnO and/or CaO and/or SrO and/or BaO system in particular composition range, the optical glass having the optical constants which are the refractive index (nd) in a range of 1.70 to 1.75 and the Abbe number (vd) in a range of 45.0 to 54.0. Therefore, its glass transformation temperature (Tg) is between 500° C. and 580° C., which is low, and the resistance to devitrification properties in the temperature range when forming of the glass preform material is performed and in the temperature range when the precision press molding is performed are excellent. Moreover, the coloration is small, and the light transmittance is also excellent. Therefore, it is suitable and usable for forming a glass preform material used for precision press molding, and for precision press molding.

The entire disclosure of Japanese Patent Application No. 2001-202605 filed on Jul. 3, 2001 including specification, claims, drawings and summary are incorporated herein by reference in its entirety.

What is claimed is:

1. An optical glass comprising:
   more than 5 to 15 mass % of $SiO_2$;
   20 to less than 30 mass % of $B_2O_3$;
   a total amount of $SiO_2+B_2O_3$ being more than 25 to 40 mass %;
   more than 21 to less than 30 mass % of $La_2O_3$;
   more than 5 to 15 mass % of $Y_2O_3$;
   0 to less than 10 mass % of $Gd_2O_3$;
   1 to 8 mass % of $ZrO_2$;
   0.1 to 5 mass % of $Nb_2O_5$;
   more than 5 to 12 mass % of $Ta_2O_5$;
   a total amount of $ZrO_2+Nb_2O_5+Ta_2O_5$ being 7 to 20 mass %;
   0 to 10 mass % of ZnO;
   0 to 10 mass % of CaO;
   0 to 5 mass % of SrO;
   0 to 10 mass % of BaO;
   a total amount of ZnO+CaO+SrO+BaO being 5 to 15 mass %;
   1 to 8 mass % of $Li_2O$;

0 to 1 mass % of $Sb_2O_3$; and
0 to 1 mass % of $As_2O_3$;
  wherein the optical glass has optical constants which are a refractive index (nd) in a range of 1.70 to 1.75 and an Abbe number (vd) in a range of 45.0 to 54.0;
  wherein a glass transformation temperature (Tg) of the optical glass is in a range of 500 to 580° C.;
  wherein the optical glass is substantially free of $Yb_2O_3$ and $Al_2O_3$, and devitrification is not generated when the optical glass is kept at a temperature of 920° C. for two hours.

2. The optical glass as claimed in claim 1, wherein the devitrification is not generated when the optical glass is kept at a temperature of the glass transformation temperature (Tg)+80° C. for 30 minutes.

3. The optical glass as claimed in claim 1, wherein the devitrification is not generated when the optical glass is kept at a temperature of the glass transformation temperature (Tg)+140° C. for 30 minutes.

4. The optical glass as claimed in claim 1, wherein the optical glass is substantially free of a fluorine, a PbO, a $WO_3$ and an $SnO_2$ components.

5. The optical glass as claimed in claim 2, wherein the optical glass is substantially free of a fluorine, a PbO, a $WO_3$ and an $SnO_2$ components.

6. The optical glass as claimed in claim 3, wherein the optical glass is substantially free of a fluorine, a PbO, a $WO_3$ and an $SnO_2$ components.

* * * * *

UNITED STATES PATENT AND TRADEMARK OFFICE
CERTIFICATE OF CORRECTION

PATENT NO.       : 7,138,348 B2
APPLICATION NO.  : 10/731002
DATED            : November 21, 2006
INVENTOR(S)      : Susumu Uehara It is certified that error appears in the above-identified patent and that said Letters Patent is hereby corrected as shown below:

Column 1, line 3 - Replace "This is a Continuation-in-Part of application Ser. No. 10/172,997 filed Jun. 18, 2002 now U.S. Pat. No.6,753,281 issued on Jun. 22, 2004. The entire disclosure of the prior application is hereby incorporated by reference herein in its entirety." with --This is a Continuation-in-Part of Application No. 10/172,997 filed June 18, 2002 now U.S. Patent 6,753,281 issued on June 22, 2004. The entire disclosure of the prior application is hereby incorporated by reference herein it its entirety.--

Signed and Sealed this

Twenty-seventh Day of February, 2007

JON W. DUDAS
*Director of the United States Patent and Trademark Office*